May 4, 1965 MISAO OKABE 3,181,550
HYDRAULIC VALVE DEVICE SWITCHING AUTOMATICALLY
OVER MULTIPLE DISTRIBUTING PIPES
Filed Feb. 5, 1963 3 Sheets-Sheet 1

INVENTOR
MISAO OKABE
BY
McGlew & Toren
ATTORNEYS

May 4, 1965 MISAO OKABE 3,181,550
HYDRAULIC VALVE DEVICE SWITCHING AUTOMATICALLY
OVER MULTIPLE DISTRIBUTING PIPES
Filed Feb. 5, 1963 3 Sheets-Sheet 2
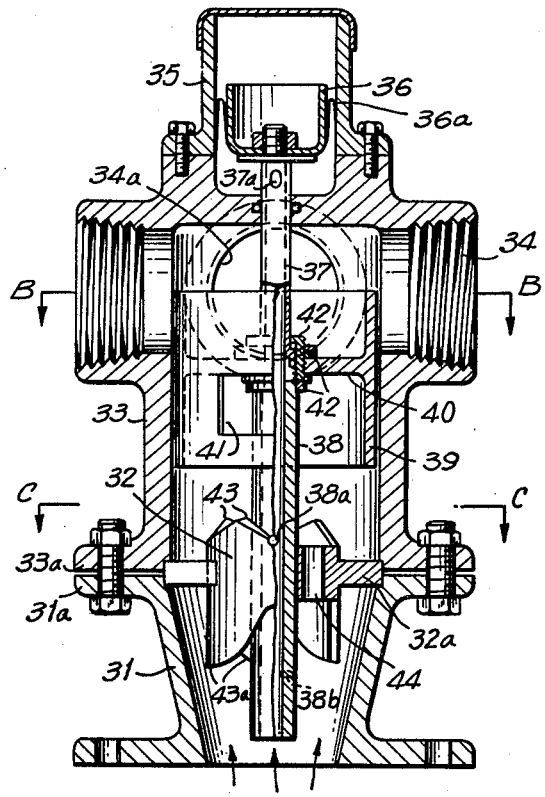
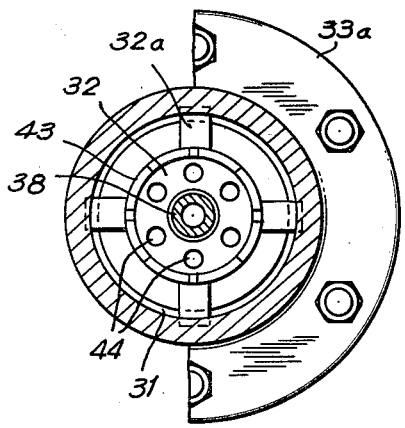
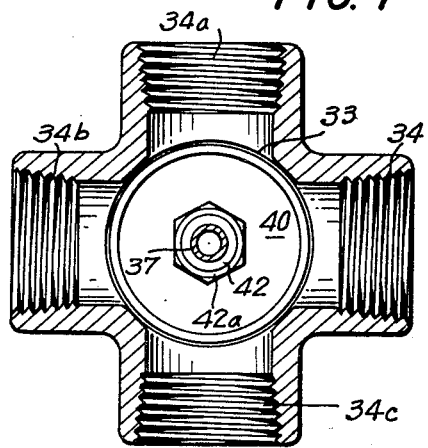
INVENTOR
MISAO OKABE
BY
McGlew & Toren
ATTORNEYS May 4, 1965  MISAO OKABE  3,181,550
HYDRAULIC VALVE DEVICE SWITCHING AUTOMATICALLY
OVER MULTIPLE DISTRIBUTING PIPES
Filed Feb. 5, 1963  3 Sheets-Sheet 3

INVENTOR
MISAO OKABE
BY
McGlew & Toren
ATTORNEYS

United States Patent Office 3,181,550
Patented May 4, 1965

3,181,550
HYDRAULIC VALVE DEVICE SWITCHING AUTOMATICALLY OVER MULTIPLE DISTRIBUTING PIPES
Misao Okabe, 35 2-chome, Aioi-cho, Shizuoka-shi, Shizuoka-ken, Japan
Filed Feb. 5, 1963, Ser. No. 256,422
Claims priority, application Japan, Feb. 8, 1962, 37/3,896; June 20, 1962, 37/25,936
6 Claims. (Cl. 137—119)

The invention relates to a hydraulic valve device for switching a supply pipe automatically between multiple distributing pipes, particularly to be used for the gravel culture.

Prior to invention, the water supplying apparatus for gravel culture has been switched with electro-magnetic valves in parallel, had much complicated electric mechanism ready to get out of order, and could not be used with pipes of large bore.

The object of the invention is to obviate the above-mentioned difficulties, and to distribute continuously water or solution by means of automatically switching a hydraulic valve between multiple pipes set in radial position, according to the operation of pump, as to result in the promotion of the gravel culture with simple construction of the water supplying apparatus instead of a complicated one.

In accordance with the invention, a hydraulic valve device is provided including a valve rod arranged for axial reciprocation through an axial bore or aperture of a cylindrical guide and cam which is coaxial with a supply passage connected to the pump. This guide is essentially cylindrical and its upper and lower edges are formed with inclined cam surfaces which cooperate with respective pins, of a pair of pins, fixed to the valve rod to extend radially therefrom. One pin is cooperable with the cam surfaces on the upper end of the guide and the other pin is cooperable with the cam surfaces on the lower end of the guide. A plurality of distribution ports extends radially from the supply passage, the distribution ports having their axes lying in a common diametric plane of the supply passage adjacent the upper end thereof. A valve ring is slidably mounted within the supply pipe and is secured to the valve rod for axial movement therewith. This valve ring has a cylindrical surface which is provided with a radial port having an arcuate extent of the order of 360° divided by the number of distribution ports. For example, with four distribution ports, the angular extent of the aperture may be of the order of 90°.

Normally, when liquid is supplied under pressure to the supply passage, the cylindrical valve ring occupies a position in which its aperture is disposed below and out of communication with any of the distribution ports. When liquid under pressure is delivered to the supply passage, the valve stem moves upwardly and the lower pin thereon engages the cam surface on the lower end of the cylindrical guide and, moving upwardly along this cam surface, is shifted angularly so as to rotate the cylindrical valve ring to a position in which its radial port is aligned with one distribution port. When the supply of liquid to the supply passage is terminated, the valve rod and the cylindrical valve ring move downwardly. As the valve rod moves downwardly, the upper radial pin thereon engages the cam surface on the upper end of the guide and this cam surface causes the pin to move angularly in such a direction that, upon the next upward movement of the valve rod, the lower pin is aligned with the next succeeding cam surface whereby, upon such upward movement of the valve rod, to rotate the cylindrical valve ring to a position aligning its radial port with the next succeeding distribution port in the same direction of rotation of the valve.

Suitable means may be provided for effecting upward movement of the valve and rod, with downward movement of the valve and rod being responsive to gravity. For example, a vaned disc may be secured to the rod in the path of the upward flow of liquid through the supply passage. Alternatively, the cylindrical valve ring may be provided with a partition above its aperture and subjected to the upward movement of liquid in the supply pipe. In one form of the invention, the guide and its cam surfaces are mounted within the supply pipe.

A valve box may be constructed with a small hydraulic chamber mounted on it and communicating with the box through tubular rods, as to equalize the hydraulic pressure pulsations of the pump for preventing the movement of the valve from the pulsatory motion. The guide of the valve rod also may be mounted outside on the valve box, and it may have peripheral cams with long, sharply inclined surfaces, so as accurately to secure the engagement and degagement of the pins of the rod with the cams.

The embodiments of the invention will now be described with reference to the accompanying drawings, wherein:

FIG. 6 is a vertical sectional view, taken on the axis of the supply pipe, through a second embodiment of the invention including a valve box connected by a frusto-conical transition piece to the pump;

FIG. 7 is a sectional view taken on the line B—B of FIG. 6;

FIG. 8 is a fragmentary sectional view taken on the line C—C of FIG. 6;

Figure 2:
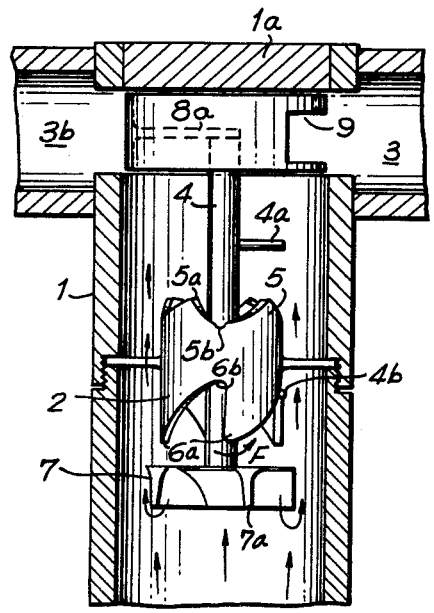
FIGS. 1 and 2 are vertical sectional views taken on the axis of the supply pipe and illustrating a first embodiment of the invention, FIG. 1 showing the valve device in the closed portion and FIG. 2 showing the valve device in the opened position.

With reference to the first embodiment of the invention as disclosed in FIGS. 1–5, a supply pipe 1 is connected to the pump, which is not indicated in the drawings, and it has an open upper end communicating with a cross formed by four distributing pipes 3, 3a, 3b, 3c which are arranged radially relatively to the supply pipe. A guide 2 is positioned coaxially within the pipe 1, and is provided with radial arms 2a fixed to the inner surface of pipe 1. Guide 2 has, on both its upper and lower ends, peripheral cams 5, 6 and four peaks 5a, 6a and valley 5b, 6b positioned alternately. A valve rod 4 extends slidably through an axial perforation or bore 2b of the guide 2, and carries a pair of axially spaced pins 4a and 4b to be guided by the cams 5, 6, respectively. At the upper end of the rod 4, a valve ring 8 is fixed by radial arms 8a, and is slidably fitted within the upper end of the pipe 1. Cylindrical valve ring 8 has an orifice 9 extending through substantially 90° of the circular side wall as to be aligned the bores of the respective distributing pipes 3. A disc 7 is attached to the lower end of the rod 4 and has radially curved blades 7a relieved on the downside.

Figure 1:
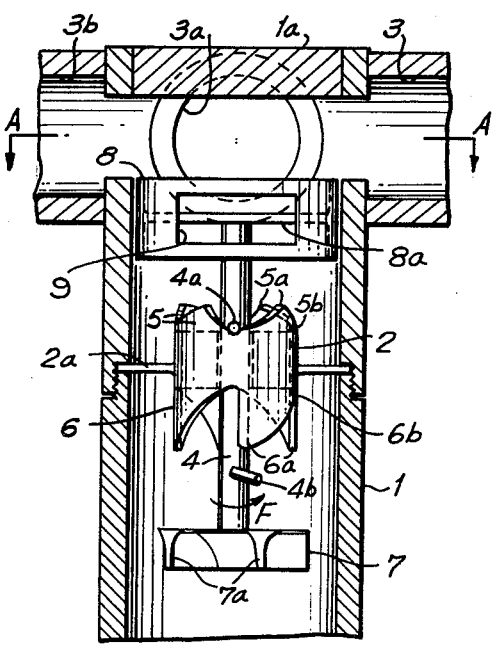
Figure 4:
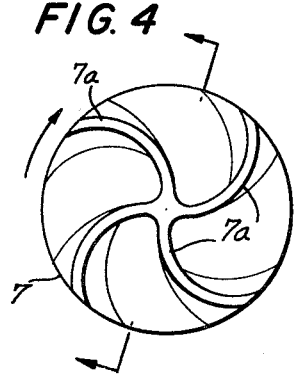
FIG. 4 is a plan view of a lower surface of a disc, with relieved blades or vanes in radial curves.
Figure 3:
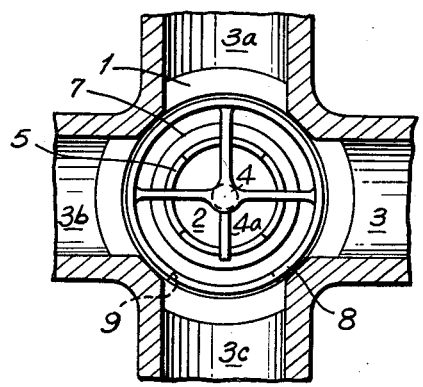
FIG. 3 is a sectional view taken on the line A—A of FIG. 1.
Figure 5:
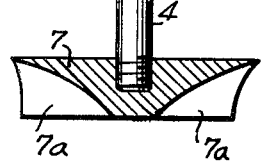
FIG. 5 is a central section of FIG. 4.

When water from the pump rushes into the supply pipe 1, the disc 7 is pushed upward under hydraulic pressure, and tends to be rotated by the blades 7d in a certain direction, as indicated with arrow F in FIG. 1 at the same time, the rod 4 moves upward so as to guide the pin 4b, sliding on the cam 6, from the peak 6a to the valley 6b. The ring 8 at the upper end of the rod 4 slides up helically within the pipe 1 to engage a pad or plug 1a in the cross of the pipes 3–3c, and to align the orifice 9 with the bore of the pipe 3 while blocking the openings of pipes 3a, 3b, 3c, after it makes a quarter turn (FIG. 2). The water supply to the pipe 3 communicating with the pipe 1 is maintained during the supplying of water by the pump.

When the pump ceases to supply water, and hydraulic pressure diminishes against the undersurface of the disc 7, the ring valve 8, rod 4 and disc 7, descend due to gravity and lowers the ring 8 into the upper end of the pipe 1, automatically closing the valve. In this position, the pin 4b of the rod 4 disengages cam 6 as the pin 4a engages the adjacent edge 5a–5b of the cam 5, and the rod 4 is led to set the pin 4a down at the valley 5b for the next quarter turn of the valve ring 8 moving upward. Thus the valve device switches automatically between the four distributing pipes 3, 3a, 3b, 3c repeatedly and in order so as to supply water in the gravel culturing.

In the valve device according to the second embodiment of the invention, as shown in FIGS. 6–8, a generally cylindrical valve box 33 is fixed to the larger end of a frustoconical transition section 31, with bolting of the flanges 33a, 31a, by means of which the guide 32 is damped coaxially in the bore and supported by arms 32a. The smaller end of section 31 is connected to the pump. As the upper side of the box 33, threaded outlets 34, 34a, 34b, 34c project radially to be connected with four distributing pipes, which are not indicated in the drawings. In a hydraulic chamber 35 disposed on the box 33, a valve 36 attached with a diaphragm 36a is fixed to the upper end of a tubular rod 37 having a slot 37a. The lower end of the rod 37 in the box 33 is freely rotatably connected by means of a nut 42 and rings 42a, to the upper end of a tubular rod 38 connected to a valve ring 39 having a closed upper end. Ring 39 has an orifice 41 extending through a quarter part of its cylindrical side sidewall, and is slidable within the box 33. The tubular rod 37 projecting within the chamber 35 communicates with the tubular rod 38 which extends through the axial perforation or bore of the guide 32. Rod 38 has a pair of pins 38a and 38b projecting radially therefrom and engageable respectively with the cams 43, 43a of the guide 42. The guide has apertures 44 therethrough arranged in a circle for flow of water therethrough.

When water from the pump rushes into the valve box 33, it enters partly into the chamber 35 through slot 37a of the tubular rod 37 communicating with the tubular rod 38 having open ends. The hydraulic pressure on the valve 36 in the chamber 35 is more slowly increasing and decreasing than that in the box 33, due to the water entering and exhausting through the narrow bores of the rods 37, 38 and the slots 37a, and it equalizes or smoothens the movement of the valve 39 which is subjected to the pulsatory motion of water supplied by the pump. It serves to keep the valve from the vibration, by preventing excessive reciprocation or hunting, as well as preventing wear of the body and seat of the valve. Furthermore, it steadies downward movement of the valve immediately after water supplying is over in the gravel culture.

Figure 9:
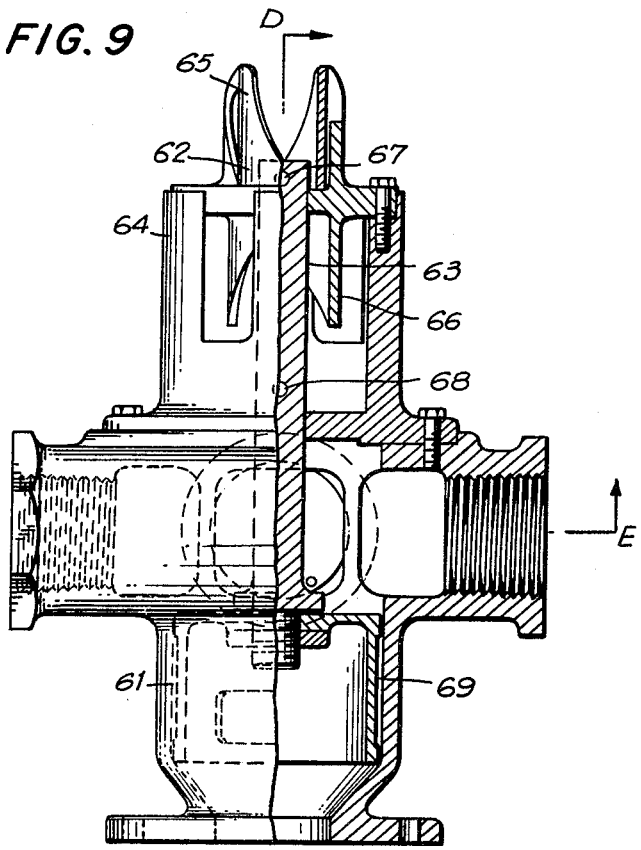
FIG. 9 is a vertical sectional view, on the axis of the liquid supply pipe, through a third embodiment of the invention and illustrating a guide for the valve rod mounted outside of the valve box.
Figure 10:
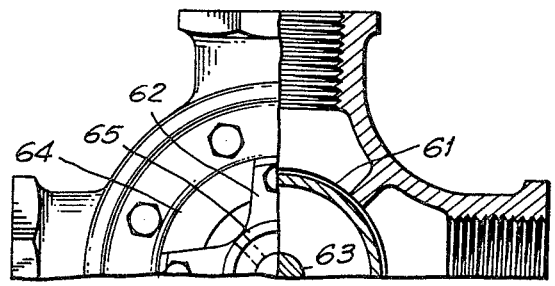
FIG. 10 is a fragmentary sectional view taken on the line D–E of FIG. 9.

In the third embodiment of the invention, as shown in FIGS. 9 and 10, a guide 62 for a longitudinal thrust rod 63 is located outside of a cylindrical valve-box 61 of comparatively little capacity, and it is fixed on the top of a support 64 which is mounted, as in stead of the hydraulic chamber 35 in the second embodiment, on the box 61 having no guiding means inside. On the periphery of the upper and lower ends of the guide 62 are cams 65, 66 which have respectively long edges which are sharply inclined so as to engage accurately with a pair of radial pins 67, 68 of the rod 63. On the lower end of rod 63 into the box 61, the valve 70 is fitted for moving slidably and rotatively without counter force in the box 16, so as to switch smoothly between the distributing pipes.

What I claim is:

1. A hydraulic valve device operable, upon successive actuations thereof, to connect plural distribution lines respectively and sequentially to a source of liquid under pressure, said valve device comprising, in combination, means forming an upwardly extending liquid supply passage having a lower end for connection to a supply of liquid under pressure; plural distribution ports arranged in a common diametric plane adjacent the upper end of said passage and spaced at substantially uniform angular spacings therearound; a substantially cylindrical valve in said passage and having an outer diameter of the order of the inner diameter of said passage, said valve having a radial port in a cylindrical side wall in communication with said passage below said valve; a rod secured to extend axially from said valve; a substantially cylindrical sleeve coaxial with said passage; means supporting said sleeve against axial displacement relative to said passage; said sleeve having means extending transversely of its interior and formed with an axial aperture slidably receiving said rod for guided displacement thereof axially of said passage; said sleeve having first cam means on its upper periphery and second cam means on its lower periphery; first and second radial pins on said rod respectively cooperable with said first and second cam means; said first radial pin in cooperation with said first cam means limiting the lower position of said valve to a level below said distribution ports, and said second radial pin in cooperation with said second cam means limiting upward movement of said valve to a position in which its radial port is centered on such diametric plane; and means secured to said rod and operable, responsive to admission of liquid under pressure into said passage, to move said rod and said valve upwardly; said second radial pin, in engagement with said second cam means during such upward movement, angularly displacing said cylindrical valve to move the radial port thereof into registry with one of said distribution ports when said valve is at its upper limit of movement; said valve and said rod descending by gravity when the supply of liquid under pressure to said passage is terminated; said first radial pin, in engagement with said first cam means during descent of said rod and said valve angularly displacing said valve and said rod in the direction of displacement thereof by said second radial pin in cooperation with said second cam means, whereby, upon a subsequent upward movement of said rod and said valve means, said second pin in cooperation with said second cam means will angularly displace said valve in the same direction to register its radial port with the next succeeding distribution port in the same direction; the angular displacement of said valve by the combined action of said first and second pins, and said first and second cam means, being equal to the angular distance between adjacent distribution ports.

2. A hydraulic valve device operable, upon successive actuations thereof, to connect plural distribution lines respectively and sequentially to a source of liquid under pressure, said valve device comprising, in combination, means forming an upwardly extending liquid supply passage having a lower end for connection to a supply of liquid under pressure; plural distribution ports arranged in a common diametric plane adjacent the upper end of said passage and spaced at substantially uniform angular spacings therearound; a substantially cylindrical valve in said passage and having an outer diameter of the order of the inner diameter of said passage, said valve having a radial port in a cylindrical side wall in communication with said passage below said valve; a rod secured to extend axially from said valve; a substantially cylindrical sleeve coaxial with said passage; means supporting said sleeve against axial displacement relative to said passage; said sleeve having means extending transversely of its interior and formed with an axial aperture slidably receiving said rod for guided displacement thereof axially of said passage; said sleeve having first cam means on its upper periphery and second cam means on its lower periphery; first and second radial pins on said rod respectively cooperable with said first and second cam means; said first radial pin in cooperation with said first cam means limiting the lower position of said valve to a level below said distribution ports, and said second radial pin in cooperation with said second cam means limiting upward movement of said valve to a position in which its radial port is centered on such diametric plane; and means secured to said rod and operable, responsive to admission of liquid under pressure into said passage, to move said rod and said valve upwardly; said second radial pin, in engagement with said second cam means during such upward movement, angularly displacing said cylindrical valve to move the radial port thereof into registry with one of said distribution ports when said valve is at its upper limit of movement; said valve and said rod descending by gravity when the supply of liquid under pressure to said passage is terminated; said first radial pin, in engagement with said first cam means during descent of said rod and said valve angularly displacing said valve and said rod in the direction of displacement thereof by said second radial pin in cooperation with said second cam means, whereby, upon a subsequent upward movement of said rod and said valve means, said second pin in cooperation with said second cam means will angularly displace said valve in the same direction to register its radial port with the next succeeding distribution port in the same direction; the angular displacement of said valve by the combined action of said first and second pins, and said first and second cam means, being equal to the angular distance between adjacent distribution ports; said sleeve being positioned within said supply passage and beneath said cylindrical valve.

3. A hydraulic valve device operable, upon successive actuations thereof, to connect plural distribution lines respectively and sequentially to a source of liquid under pressure, said valve device comprising, in combination, means forming an upwardly extending liquid supply passage having a lower end for connection to a supply of liquid under pressure; plural distribution ports arranged in a common diametric plane adjacent the upper end of said passage and spaced at substantially uniform angular spacings therearound; a substantially cylindrical valve in said passage and having an outer diameter of the order of the inner diameter of said passage, said valve having a radial port in a cylindrical side wall in communication with said passage below said valve; a rod secured to extend axially from said valve; a substantially cylindrical sleeve coaxial with said passage; means supporting said sleeve against axial displacement relative to said passage; said sleeve having means extending transversely of its interior and formed with an axial aperture slidably receiving said rod for guided displacement thereof axially of said passage; said sleeve having first cam means on its upper periphery and second cam means on its lower periphery; first and second radial pins on said rod respectively cooperable wtih said first and second cam means; said first radial pin in cooperation with said first cam means limiting the lower position of said valve to a level below said distribution ports, and said second radial pin in cooperation with said second cam means limiting upward movement of said valve to a position in which its radial port is centered on such diametric plane; and means secured to said rod and operable, responsive to admission of liquid under pressure into said passage, to move said rod and said valve upwardly; said second radial pin, in engagement with said second cam means during such upward movement, angularly displacing said cylindrical valve to move the radial port thereof into registry with one of said distribution ports when said valve is at its upper limit of movement; said valve and said rod descending by gravity when the supply of liquid under pressure to said passage is terminated; said first radial pin, in engagement with said first cam means during descent of said rod and said valve angularly displacing said valve and said rod in the direction of displacement thereof by said second radial pin in cooperation with said second cam means, whereby, upon a subsequent upward movement of said rod and said valve means, said second pin in cooperation with said second cam means will angularly displace said valve in the same direction to register its radial port with the next succeeding distribution port in the same direction; the angular displacement of said valve by the combined action of said first and second pins, and said first and second cam means, being equal to the angular distance between adjacent distribution ports; said sleeve being positioned within said supply passage and beneath said cylindrical valve; said means for lifting said valve responsive to supply of liquid under pressure to said passage comprising a disc secured to the lower end of said rod and having turbo vanes on its undersurface subjected to the action of liquid flowing under pressure upwardly through said supply passage.

4. A hydraulic valve device operable, upon each successive operation, to connect plural distribution lines respectively and sequentially to a source of liquid under pressure, said valve comprising, in combination, a valve body formed with an upwardly extending liquid supply passage having a lower end for connection to a supply of liquid under pressure; said valve body being formed with plural distribution ports arranged in a common diametric plane adjacent the upper end of said passage and spaced at substantially uniform angular spacings therearound; a substantially cylindrical valve in said passage and having an outer diameter of the order of the inner diameter of said passage, said valve having a radial port in a cylindrical side wall in communication with said passage below said valve; a first tubular rod secured to said valve for rotation therewith and extending axially therefrom; a substantially cylindrical sleeve positioned in said passage coaxially therewith; means supporting said sleeve against axial displacement relative to said passage; said sleeve having means extending tranversely of its interior and formed with an axial aperture slidably receiving said first tubular rod for guided displacement of the latter axially of said passage; a sealed cylindrical chamber located on the exterior of said valve body coaxially with said passage; a flexible diaphragm subdividing said chamber into an outer section and an inner section; a second tubular rod having its upper end secured to said diaphragm and extending through an aperture in said valve body with its lower end rotatably connected and communicating with the upper end of said first tubular rod; said second tubular rod having a side wall aperture therein opening into the inner section of said sealed chamber; said first and second tubular rods, upon supply of liquid under pressure to said passage, providing for flow of liquid into the inner section of said sealed chamber to raise said diaphragm to move said tubular rods and said cylindrical valve upwardly; said sleeve having first cam means on its upper periphery and second cam means on its lower periphery; and first and second radial pins on said rod respectively cooperable with said first and second cam means; said first cam means in cooperation with said first radial pin limiting downward movement of said cylindrical valve to a position beneath and out of communication with said distribution ports; said second radial pin in cooperation with said second cam means limiting upward movement of said cylindrical valve to a position in which its radial port is centered on such diametric plane; said second radial pin, in cooperation with said second cam means, upon upward movement of said cylindrical valve and said tubular rods angularly displacing said cylindrical valve to bring its radial port into registry with one of said distribution ports; said first radial pin, in cooperation with said first cam means, being effective, upon downward movement of said cylindrical valve and said tubular rods, to further angularly displace said cylindrical valve in the same direction to position said second radial pin angularly with respect to said second cam means such that, upon subsequent admission of liquid under pressure to said supply passage, said cylindrical valve will be angularly displaced in the same direction to register its radial port with the distribution port next in sequence in the same direction; the total angular displacement effected by said first radial pin, in cooperation with said first cam means, and said second radial pin, in cooperation with said second cam means, being equal to the angular spacing of adjacent distribution ports; said chamber and diaphragm acting to smooth out pulsations due to pulsating supply of liquid under pressure to said passage.

5. A hydraulic valve device operable, upon successive actuations thereof, to connect plural distribution lines respectively and sequentially to a source of liquid under pressure, said valve device comprising, in combination, a valve body formed with an upwardly extending liquid supply passage having a lower end for connection to a supply of liquid under pressure; plural distribution ports arranged in said valve body in a common diametric plane adjacent the upper end of said passage and spaced at substantially uniform angular spacings therearound; a substantially cylindrical valve in said passage and having an outer diameter of the order of the inner diameter of said passage, said valve having a radial port in a cylindrical side wall in communication with said passage below said valve; a rod secured to extend axially from said valve; a substantially cylindrical sleeve coaxial with said passage; means supporting said sleeve against axial displacement relative to said passage; said sleeve having means extending transversely of its interior and formed with an axial aperture slidably receiving said rod for guided displacement thereof axially of said passage; said sleeve having first cam means on its upper periphery and second cam means on its lower periphery; first and second radial pins on said rod respectively cooperable with said first and second cam means; said first radial pin in cooperation with said first cam means limiting the lower position of said valve to a level below said distribution ports, and said second radial pin in cooperation with said second cam means limiting upward movement of said valve to a position in which its radial port is centered on such diametric plane; and means secured to said rod and operable, responsive to admission of liquid under pressure into said passage, to move said rod and said valve upwardly; said second radial pin, in engagement with said second cam means during such upward movement, angularly displacing said cylindrical valve to move the radial port thereof into registry with one of said distribution ports when said valve is at its upper limit of movement; said valve and said rod descending by gravity when the supply of liquid under pressure to said passage is terminated; said first radial pin, in engagement with said first cam means during descent of said rod and said valve, angularly displacing said valve and said rod in the direction of displacement thereof by said second radial pin in cooperation with said second cam means, whereby, upon a subsequent upward movement of said rod and said valve means, said second pin in cooperation with said second cam means will angularly displace said valve in the same direction to register its radial port with the next succeeding distribution port in the same direction; the angular displacement of said valve by the combined action of said first and second pins, and said first and second cam means, being equal to the angular distance between adjacent distribution ports; said cylindrical sleeve being mounted externally on said valve body and said rod extending outwardly through said valve body and coaxially of said cylindrical sleeve.

6. A hydraulic valve device, as claimed in claim 5, in which said valve has a closed upper end and an open lower end; a tubular support secured to the external surface of said valve body and in coaxial relation with said supply passage and extending outwardly from said valve body; said tubular sleeve having radial arms extending therefrom intermediate its length and secured to the outer end of said tubular support.

References Cited by the Examiner
UNITED STATES PATENTS

| | | | |
|---|---|---|---|
| 1,326,046 | 12/19 | Goodhue | 137—119 |
| 2,678,845 | 5/54 | Fitter | 239—66 X |
| 3,042,074 | 7/62 | Graybill | 137—119 X |

M. CARY NELSON, *Primary Examiner.*